United States Patent
Rogers et al.

(10) Patent No.: US 8,458,582 B2
(45) Date of Patent: Jun. 4, 2013

(54) SYSTEM AND METHOD FOR TRANSLATING INSURANCE-RELATED DATA

(75) Inventors: James S. Rogers, Willington, CT (US); James Daniel Scott, Manchester, CT (US); M. Gary Letscher, Simsbury, CT (US); Jill Spranzo, Torrington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 471 days.

(21) Appl. No.: 12/618,015

(22) Filed: Nov. 13, 2009

(65) Prior Publication Data

US 2011/0119574 A1 May 19, 2011

(51) Int. Cl.
*G06F 17/00* (2006.01)

(52) U.S. Cl.
USPC ........... 715/212; 715/253; 715/221; 715/248; 705/5; 705/26.4

(58) Field of Classification Search
USPC ...... 715/224, 225, 226, 212, 221, 253; 705/4, 705/26.4
See application file for complete search history.

(56) References Cited

U.S. PATENT DOCUMENTS

| | | | |
|---|---|---|---|
| 6,839,714 B2 | 1/2005 | Wheeler et al. | |
| 6,928,487 B2 | 8/2005 | Eggebraaten et al. | |
| 7,234,103 B1 * | 6/2007 | Regan | 715/234 |
| 7,257,647 B2 | 8/2007 | Katz et al. | |
| 7,603,301 B1 * | 10/2009 | Regan | 705/31 |
| 2002/0042835 A1 | 4/2002 | Pepin et al. | |
| 2002/0124040 A1 | 9/2002 | Foster et al. | |
| 2002/0198743 A1 | 12/2002 | Ariathurai et al. | |
| 2004/0153362 A1 | 8/2004 | Bauer et al. | |
| 2005/0055249 A1 * | 3/2005 | Helitzer et al. | 705/4 |
| 2005/0182668 A1 | 8/2005 | Debber | |
| 2006/0178961 A1 * | 8/2006 | Stanley et al. | 705/31 |
| 2007/0214020 A1 | 9/2007 | Srinivasan et al. | |
| 2008/0005356 A1 | 1/2008 | Katz et al. | |
| 2008/0065427 A1 | 3/2008 | Helitzer et al. | |
| 2008/0077451 A1 | 3/2008 | Anthony et al. | |
| 2009/0024639 A1 * | 1/2009 | Steinmann | 707/100 |
| 2009/0037228 A1 | 2/2009 | Engel | |
| 2009/0119133 A1 | 5/2009 | Yeransian et al. | |
| 2009/0132399 A1 * | 5/2009 | Pavlou et al. | 705/31 |
| 2009/0287591 A1 * | 11/2009 | Wyle et al. | 705/31 |
| 2011/0022419 A1 * | 1/2011 | Ziade et al. | 705/4 |

\* cited by examiner

*Primary Examiner* — Stephen Hong
*Assistant Examiner* — Matthew Ludwig
(74) *Attorney, Agent, or Firm* — Howard IP Law Group, PC

(57) ABSTRACT

A computer system includes a processor; and a memory storage device in communication with the processor. The processor is adapted to: receive via a computer communications network a user identification and an identification of an electronic file having user-generated insurance-related data; provide an output signal for display to the user a prompt for the user to provide mapping data mapping a plurality of insurance-related data fields data identifiers in the user-data electronic file; receive mapping data in response to the prompt; access the user electronic file; employing the received mapping data, map data elements identified in the user-data electronic file, to a document in a predetermined format; verify that the received mapped data constitutes complete data to submit in connection with an insurance transaction; and provide an output signal including data constituting the document in a predetermined format to a system for further processing in accordance with an insurance transaction.

36 Claims, 10 Drawing Sheets

| Required Field | Your Field | | |
|---|---|---|---|
| Insured Name | Client Name | CONFIRM | CLEAR |
| Address Number | Number | CONFIRM | CLEAR |
| Street Name | Street | CONFIRM | CLEAR |
| City | City | CONFIRM | CLEAR |
| Zip Code | Zip | CONFIRM | CLEAR |
| SIC Code | SIC Code | CONFIRM | CLEAR |
| Building Limit | Building Coverage | CONFIRM | CLEAR |
| Liability Limit | Liability Coverage | CONFIRM | CLEAR |
| Annual Revenue | Annual Sales | CONFIRM | CLEAR |

*Fig. 9*

SYSTEM AND METHOD FOR TRANSLATING INSURANCE-RELATED DATA

FIELD OF INVENTION

The present invention relates to computer systems, and particularly to computer systems for translating and transmitting insurance-related data.

BACKGROUND

In the insurance field, data is generated and stored in a wide variety of formats. For example, insurance agencies and brokers may obtain information from their clients in telephone calls and personal meetings to meet requirements for submission of information to carriers for quotes and renewals. Such information may be extensive in nature and time consuming to obtain. The data may be stored in a variety of formats, such as various personal computer office software spreadsheet and database formats, or in insurance field specific formats. Insurance companies that receive such data may have a requirement to format the data in a predetermined format. For example, the ACORD XML format is an XML format specific to the insurance industry. Individual insurance companies may have varying requirements for format and data types in order to prepare quotes and engage in other insurance transactions. As a result of the variation in formats, data that is stored in one format often must be manually rekeyed or manually reformatted for use by another entity, resulting in unnecessary expense and risk of errors.

SUMMARY

In one embodiment, a computer includes a processor and a memory storage device in communication with the processor. The processor is adapted to: receive via a computer communications network a user identification and an identification of a user electronic file in a remote storage location, the user electronic file being in any one of a plurality of formats, and having data related to a request for an insurance quote; provide an output signal for display to the user on a display device connected to the processor via the computer communications network a prompt for the user to provide mapping data which maps data fields for requests for insurance quotes to data identifiers in the user electronic file; receive mapping data in response to the prompt; access the user electronic file; employing the received mapping data, map data elements, the elements including at least a name of the proposed insured and an address of the proposed insured, identified in the user electronic file, to an ACORD XML compliant format document; determine whether the mapped data elements constitute all required data for submission of a request for an insurance quote; and if the mapped data elements do not constitute all required data, prompt the user for further data; otherwise provide an output signal communicating the ACORD XML compliant format document to a quote evaluation system.

In an embodiment, a computer system includes a processor; and a memory storage device in communication with the processor. The processor is adapted to: receive via a computer communications network a user identification and an identification of an electronic file having user-generated insurance-related data; provide an output signal for display to the user a prompt for the user to provide mapping data which maps insurance-related data fields in the user electronic file; receive mapping data in response to the prompt; access the user electronic file; employing the received mapping data, map data elements identified in the user-data electronic file, to a document in a predetermined format; verify that the received mapped data constitutes complete data to submit in connection with an insurance transaction; and provide an output signal including data constituting the document in a predetermined format to a system for further processing in accordance with an insurance transaction.

In an embodiment, a computer system includes a processor; and a memory storage device in communication with the processor. The processor is adapted to: receive via a computer communications network a user identification and an identification of a user electronic file having insurance-related data; access from the memory storage device mapping data associated with the user identification, the mapping data identifying a format of the user electronic file and mapping between a plurality of insurance-related data fields and data identifiers in the user electronic file; access the user electronic file; employing the accessed mapping data, map data elements identified in the user electronic file, to a document in a predetermined format; verify that the mapped data constitutes complete data to submit in connection with an insurance transaction; and provide an output signal including data constituting the document in a predetermined format to a system for further processing in accordance with an insurance transaction.

In an embodiment, a computer-implemented method for translating insurance-related data includes receiving by a processor via a computer communications network a user identification and insurance related data; providing by the processor an output signal for display to the user a prompt for the user to provide mapping data mapping a plurality of insurance-related data fields to data identifiers in the user electronic file; receiving by the processor mapping data in response to the prompt; accessing by the processing the user insurance-related data; employing the received mapping data, mapping by the processor the user insurance-related data, and storing the mapped data in a data storage device in a document in a predetermined format; verifying by the processor that the received mapped data constitutes complete data to submit in connection with an insurance transaction; and providing by the processor an output signal including data constituting the document in a predetermined format to a system for further processing in accordance with an insurance transaction.

In an embodiment, a computer-implemented method for translating insurance-related data includes receiving by a processor a user identification and user-provided insurance-related data; accessing by the processor from a memory storage device mapping data associated with the user identification, the mapping data identifying a format of the user electronic file and mapping between a plurality of insurance-related data fields and data fields in the user-provided insurance-related data; accessing by the processor from the memory storage device a file having the user-provided insurance-related data; employing the accessed mapping data, mapping by the processor data elements identified in the user electronic file, to a document in a predetermined format, and storing the document in the predetermined format in the memory storage device; verifying by the processor that the mapped data constitutes complete data to submit in connection with an insurance transaction; and providing by the processor an output signal including data constituting the document in a predetermined format to a system for further processing in accordance with an insurance transaction.

In an embodiment, a computer-readable medium has instructions thereon, which instructions, when executed by a processor, cause the processor to: receive via a computer communications network a user identification and an identification of a user electronic file, the user electronic file being in any one of a plurality of structured formats, and having insurance-related data; provide an output signal for display to the user a prompt for the user to provide mapping data mapping a plurality of insurance-related data fields data identifiers in the user electronic file; receive mapping data in response to the prompt; access the user electronic file; employing the received mapping data, map data elements identified in the user electronic file, to a document in a predetermined format; verify that the received mapped data constitutes complete data to submit in connection with an insurance transaction; and provide an output signal including data constituting the document in a predetermined format to a system for further processing in accordance with an insurance transaction.

In an embodiment, a computer-readable medium has instructions thereon for translating insurance-related data, which instructions, when executed by a processor, cause the processor to: receive via a computer communications network a user identification and an identification of a user electronic file, the user electronic file being in any one of a plurality of structured formats, and having insurance-related data; provide an output signal for display to the user a prompt for the user to provide mapping data mapping a plurality of insurance-related data fields data identifiers in the user electronic file; receive mapping data in response to the prompt; access the user electronic file; employing the received mapping data, map data elements identified in the user electronic file, to a document in a predetermined format; verify that the received mapped data constitutes complete data to submit in connection with an insurance transaction; and provide an output signal including data constituting the document in a predetermined format to a system for further processing in accordance with an insurance transaction.

BRIEF DESCRIPTION OF THE FIGURES

FIG. 9 is an exemplary screen display showing a result of predictive mapping with user options to confirm or clear the predictive mapping, displayed on a client device by a system according to an embodiment of the invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for translation and communication of data related to insurance.

Figure 1:
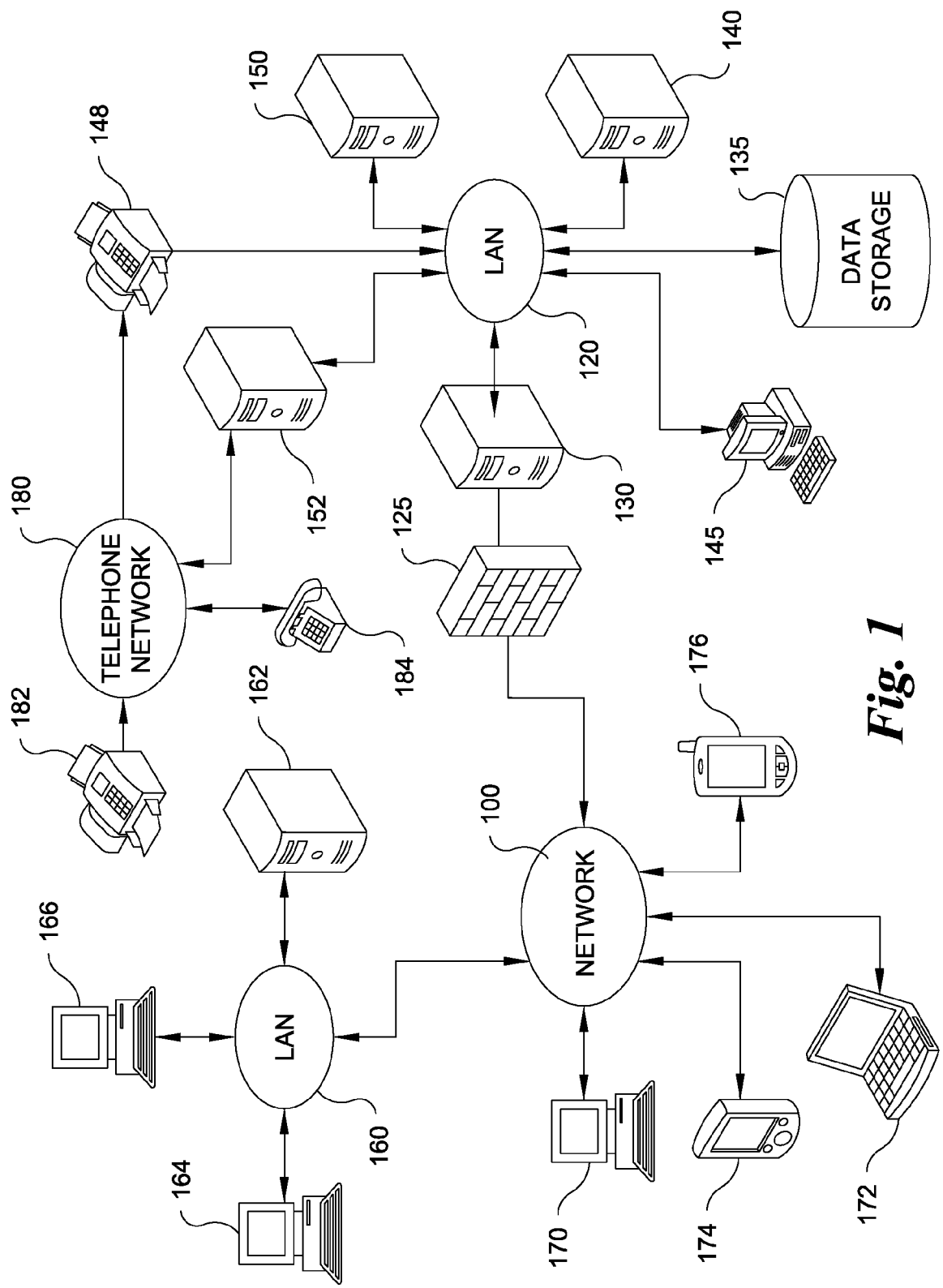
FIG. 1 is a schematic diagram of an exemplary computer network for implementation of a method and system of the invention.

Referring to FIG. 1, an exemplary network configuration is shown. Network 100 connects various computer systems and devices. Network 100 may be or include any type of network, including a local area network (LAN), a wide area network (WAN), an intranet, the Internet, a public switched telephone network (PSTN) or other network. Network 100 may employ any suitable data protocols.

Various devices and networks may be in communication with network 100. In embodiments, client device 170, a desktop computer system, client device 172, a notebook computer system, and client device 174, a personal digital assistant, and client device 176, a smart phone, are in communication with network 100. Client devices 170, 172, 174 are merely exemplary. Local area network (LAN) 160 is an exemplary network of an entity such as an insurance agency. LAN 160 has in communication therewith desktop computer systems 164, 166, and file server 162. Agency management platform software may run on file server 162 and be accessible by computer systems 164, 166 in a client-server configuration.

LAN 120 may be a network of an insurance company, by way of example. Firewall unit 125 may be configured to provide data security services with respect to systems and networks, LAN 120 and the devices in communication therewith. Firewall unit 125 may be a stand alone device including one or more processors, data storage devices, and input and output connections. Server 130 may serve as a front-end web server that formats and serves web pages to client devices running browser software. In an embodiment, a processor of server 130 may execute steps of a method of translating insurance-related data between formats. In an embodiment, server 130 may function as a web front-end for another device or system, such as server 150, which may execute steps of a method of translating insurance-related data between formats. Server 150 may serve as a data translation module. The term module, as used herein, includes computer hardware, including processors and memory devices, having loaded program code causing the processor and other devices to perform particular functions. Mainframe computer system 140 may be a system that receives data in a converted format, and performs functions such as evaluation of proposals for property and casualty insurance coverage.

In embodiments, communication between server 150 and third parties submitting data for conversion may be via a telephone network, such as a public switched telephone network, a voice over Internet protocol network, or a combination of a PSTN and VoIP network. By way of example, data may be submitted in a structured fax format and transmitted from third party fax machine 182 via telephone network 180 to insurance company fax machine 148. Insurance company fax machine 148 may be configured to create a digital image of the received fax, e.g., in an image format such as pdf, jpg or tiff, and transmit the received digital image via LAN 120 to server 150. Server 150 may perform mapping functions from the images of the received fax to a desired format. If the data in the received fax omits required data, contains obvious errors, or otherwise triggers a rule requiring a response, server 150 may be configured to provide an output in the form of a responsive fax and instructions to insurance company fax machine 148 to transmit a responsive fax to a telephone number corresponding to third party fax machine 182.

In an embodiment, a third party may employ voice telephone communications to an interactive voice response system (IVR) for the submission of data. Third party voice telephone 184 may be employed by a user to reach, via telephone network 180, IVR server 152. IVR server 152 may prompt the user to provide identification information via voice or keypad, and then prompt the user to provide data corresponding to required data for a selected insurance transaction, such as submission of applicant data to request a proposal for property or casualty coverage. IVR server 152 may communicate with server 150 via LAN 120. Server 150 may receive data from IVR server in a suitable format, and translate the data to a format suitable for submission to other systems, such as an ACORD XML format. Server 150 may provide data indicative of prompts that IVR server 152 converts to voice prompts.

In embodiments, a network or data processing network, such as network 100, may be employed which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor. The networks may also include mainframe computers or servers, such as a gateway computer or application server. A gateway computer serves as a point of entry into each network. The gateway may be preferably coupled to another network by means of one or more communications links. The gateway may also be directly coupled to one or more workstations using a communications link. The gateway computer may also be coupled to a storage device for storing information related to translation of data, such as user identifications, user-specific mapping between different data formats, requirements for data submission for one or more types of insurance transactions, as well as other data. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Figure 2:
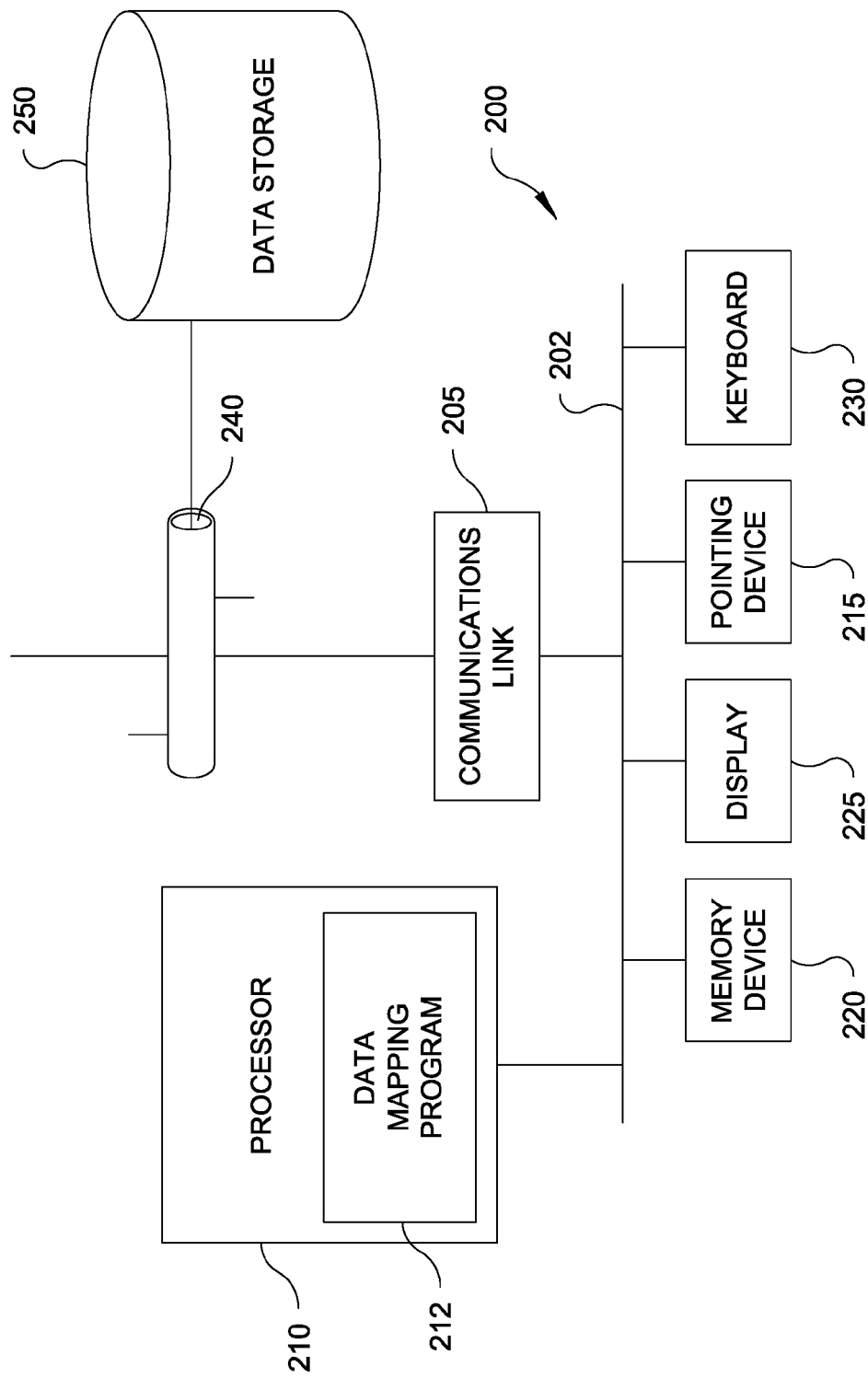
FIG. 2 is a schematic diagram of an exemplary computer system for use in the embodiments of FIG. 1.

Referring now to FIG. 2, a schematic diagram illustrates an exemplary computer system for use in the embodiment of FIG. 1. In computer system 200, processor 210 executes instructions contained in programs such as data mapping program 212. Programs may be stored on suitable media, such as optical or magnetic disks, fixed disks with magnetic storage (hard drives), tapes accessed by tape drives, and other storage media. Processor 210 communicates, such as through bus 202 and/or other data channels, with communications link 205 and memory device 220, receives data from user inputs such as pointing device 215 and keyboard 230, and provides data to outputs such as display 225. Memory device 220 is configured to exchange data with processor 210, and may store programs containing processor-executable instructions, and values of variables for use by such programs. User input may be provided at pointing device 215 and keyboard 230, as well as other optional inputs, such as touch screens. In an embodiment, inputs may be received via other user interfaces and workstations connected via wired or wireless communications and via networked communications, such as via LAN 240, to processor 210. Other output devices may be in communication with processor 210, including local and networked printers and speakers. By way of non-limiting example, one or more programs may include instructions causing processor 210 to provide output signals prompting a user to provide data relating to mapping of selected data between various data formats. Human operators may provide inputs in response to such prompts, and the inputs may be received by processor 210; processor 210 may cause data contained in such responses to be stored in a suitable format, such as in one or more database programs, in memory device 220, or in networked storage devices, such as data storage 250. Communications link 205 may communicate with remote sources of information, and with systems for implementing instructions output by processor 210, via LAN 240. LAN 240 is merely exemplary, and communication may be by one or more of suitable communication methods, including over wired or wireless local area networks and wide area networks, and over communications between networks, including over the Internet. Any suitable data and communication protocols may be employed.

Figure 3:
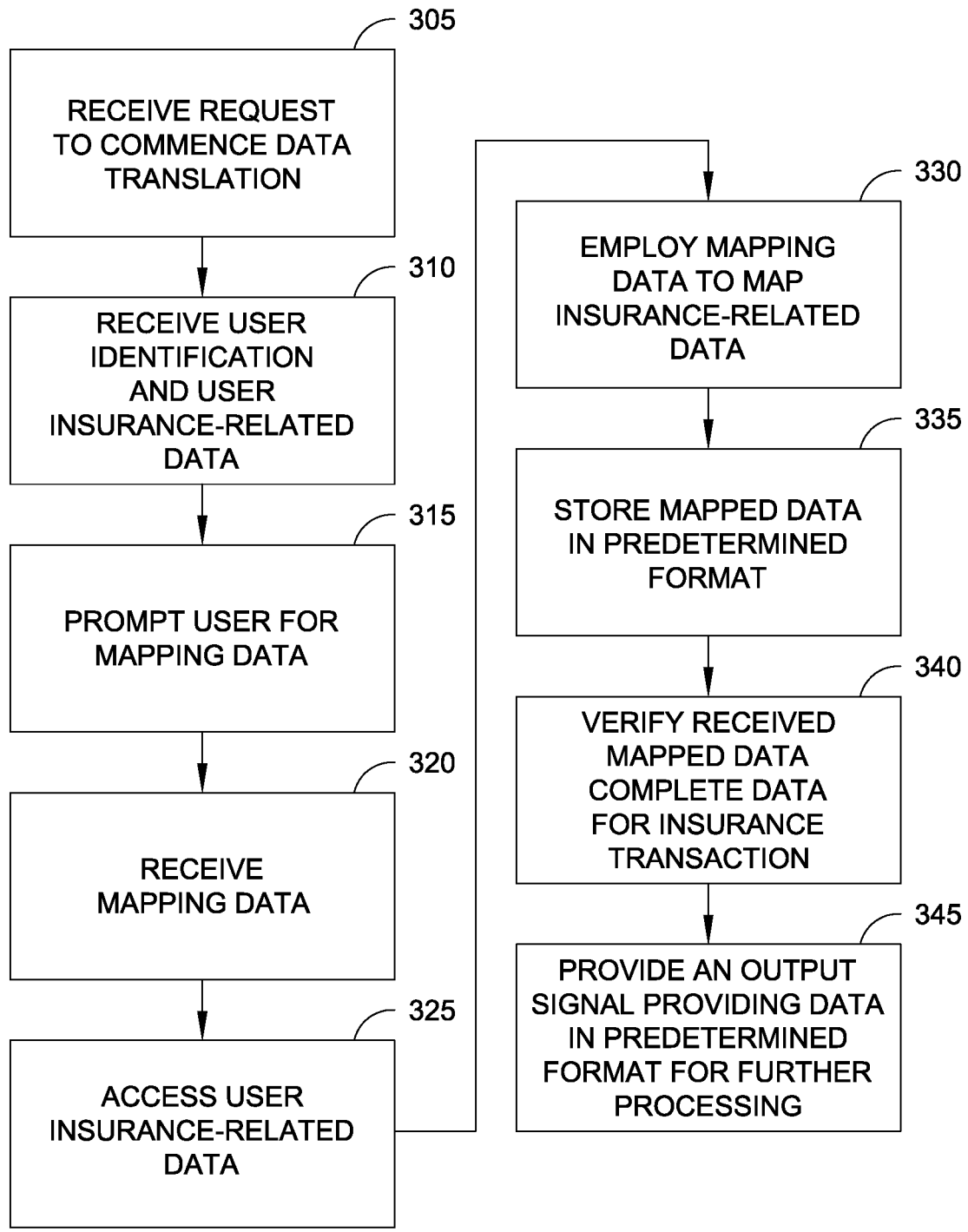
FIG. 3 is a process flow diagram illustrating steps in an embodiment of a method of the invention.

Referring now to FIG. 3, a processor, such as a processor of server 150, receives 305, via a computer communications network, such as LAN 120, data indicative of a request to commence a data translation transaction. The processor may receive 310 via the computer communications network a user identification and insurance related data. The processor may provide 315 an output signal for display to the user a prompt for the user to provide mapping data mapping insurance-related data fields to data identifiers in a user-electronic file. The processor may receive 320 mapping data in response to the prompt. The processor may access 325 the user insurance-related data. The processor may employ 330 the received mapping data to map the user insurance-related data. The processor may store 335 the mapped data in a data storage device in a document in a predetermined format. The processor may verify 340 that the received mapped data constitutes complete data to submit in connection with an insurance transaction. The processor may provide 345 an output signal including data constituting the document in a predetermined format to a system for further processing in accordance with an insurance transaction.

Figure 4:
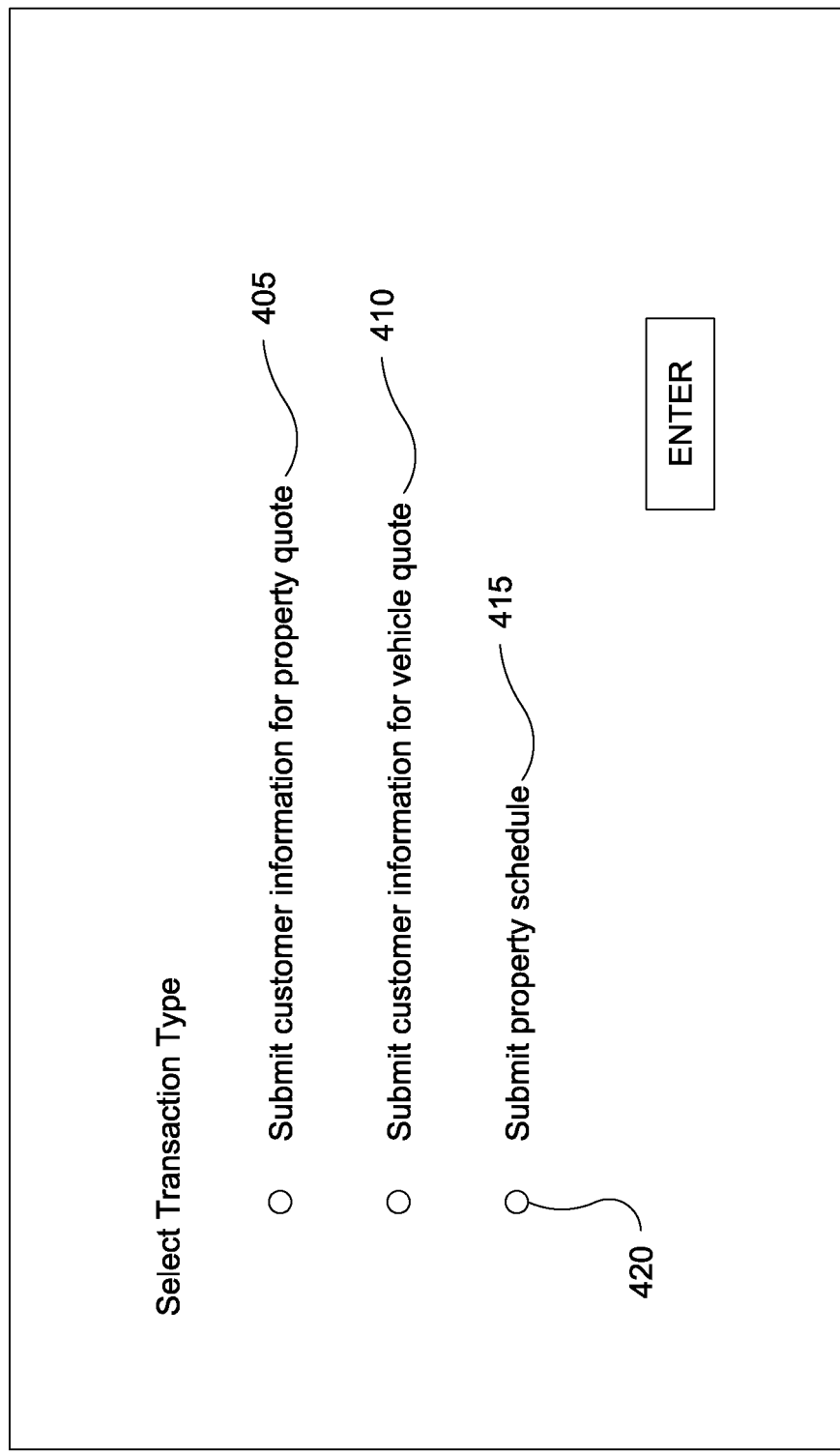
FIG. 4 is an exemplary screen display prompting a user to select a transaction type in a method and system of the invention.

Referring now to FIG. 4, an exemplary screen 400 is shown provided to a user after login. The user is prompted to select a type of insurance transaction. Exemplary insurance transactions shown are Submit customer information for property quote 405, Submit customer information for vehicle quote 410 and Submit property schedule 415. A user may select a radio button 420 and the enter button to respond to the prompt and provide data indicative of a selection of a type of insurance transaction.

Figure 10:
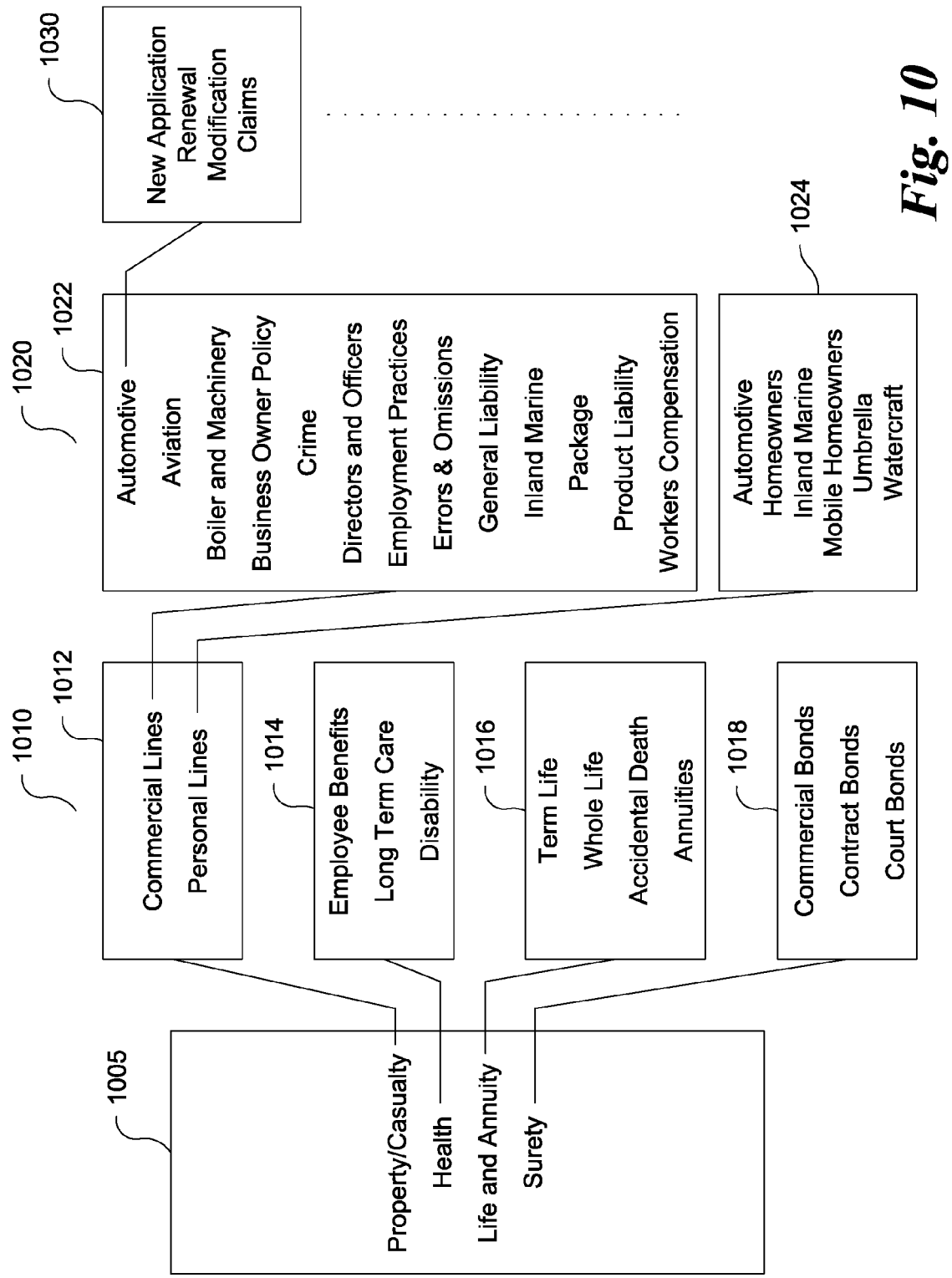
FIG. 10 is an exemplary partial menu arrangement in an embodiment of the invention.

Screen 400 is merely exemplary. Numerous other transactions are possible. Referring to FIG. 10, a series of menus may be presented to select a transaction. In a first menu 1005, the system may provide to the user device for display a selection of a property & casualty menu, a health menu, a life and annuity menu and a surety menu. Upon receipt of the user selection from the user device, the system may present the selected one of the second level menus 1010 for display on the user device. Second level menus may include a property/casualty second level menu 1012, a health second level menu 1014, a life and annuity second level menu 1016, and a surety second level menu 1018. Each second level menu indicates a category of insurance product. Upon receipt by a system of a user selection of a second level menu item, a system may present to the user a menu from the third level menu 1020. Each menu in the third level may be for a particular category of insurance product, such as automotive, aviation and the like in menu 1022, or automotive, homeowners and inland marine in menu 1024. Corresponding third menus may be provided for the health, life and annuity, and surety categories. Upon receipt by a system of a user selection of a third level menu item, a system may present to the user a menu from the fourth level menu 1030. The example presented here is a fourth menu level identifying particular transactions. In response to receipt by a system of a user selection of a transaction from a fourth level menu 1030, the system commences the mapping process. The number and arrangement of menus is merely exemplary, and may be varied.

Data items may include a wide variety of information, including, for example for a business owner s policy:
Name of business
Entity type
Address information
Name and addresses of principals
Business type, by SIC code, for example
Date or year started
Date or year started in type of business
Date in current location
Number of employees
Annual payroll
Annual revenue
Identification of personal property items, such as computers and other equipment
For each location: Address, area occupied, type of construction, year of construction and number of floors
Limits of liability coverage sought
Limit of building coverage sought
Limit of employee dishonesty coverage sought
In submitting data for a new quote for a Business Owner s Policy, there may be 50 to 75 fields to be mapped.

Figure 5:
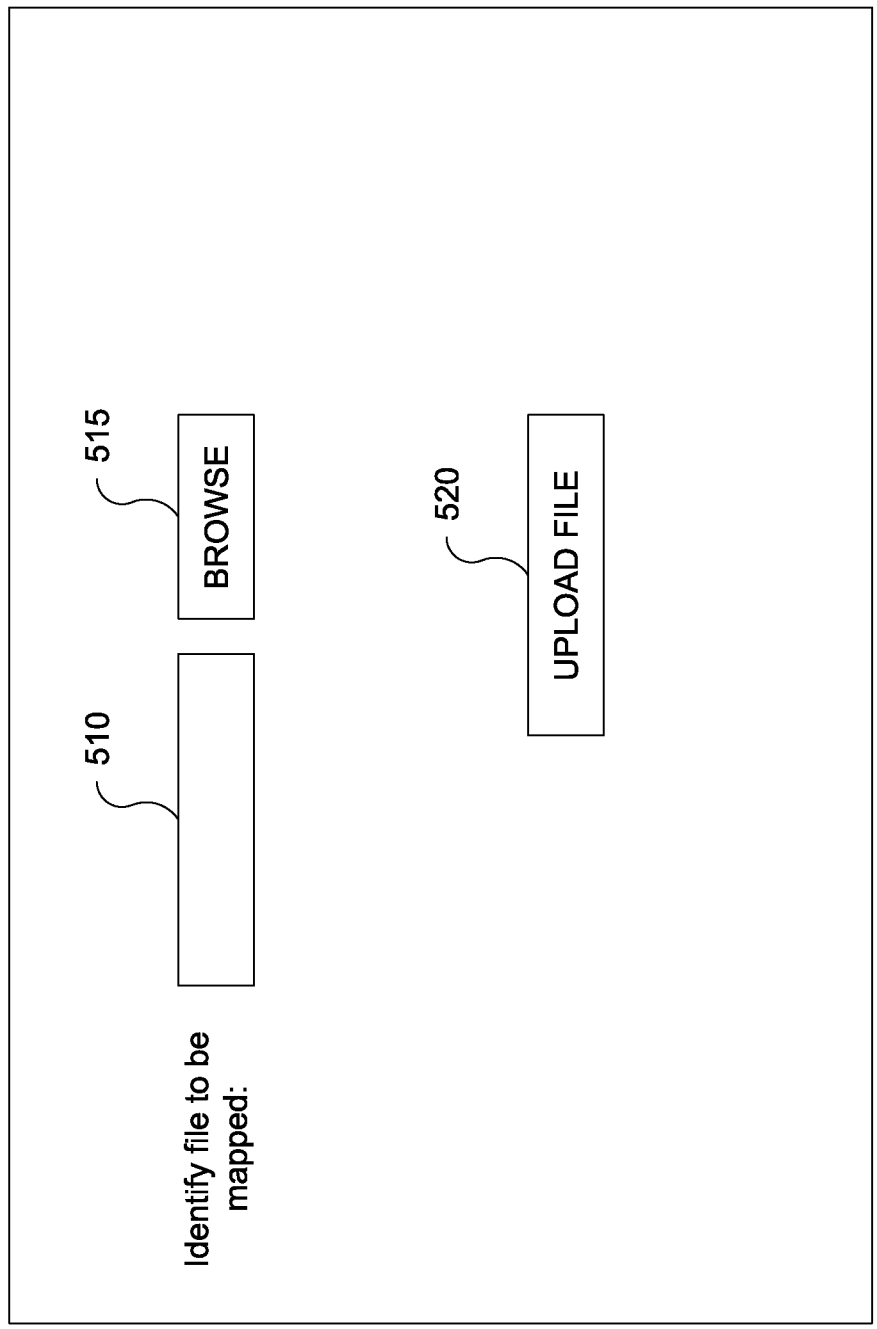
FIG. 5 is an exemplary screen display prompting a user to upload a file in a method and system of the invention.

Referring now to FIG. 5, an exemplary screen provided in response to a user selection of a type of transaction is shown. The user is prompted to identify a file to be mapped by providing a path and file name in a web form at block 510 or may launch a tool to browse data accessible from the user s system at 515. Once the path and file name have been identified, the user may select upload file 520 to cause the file to be uploaded to a server by any suitable protocol, such as http post.

Figure 6:
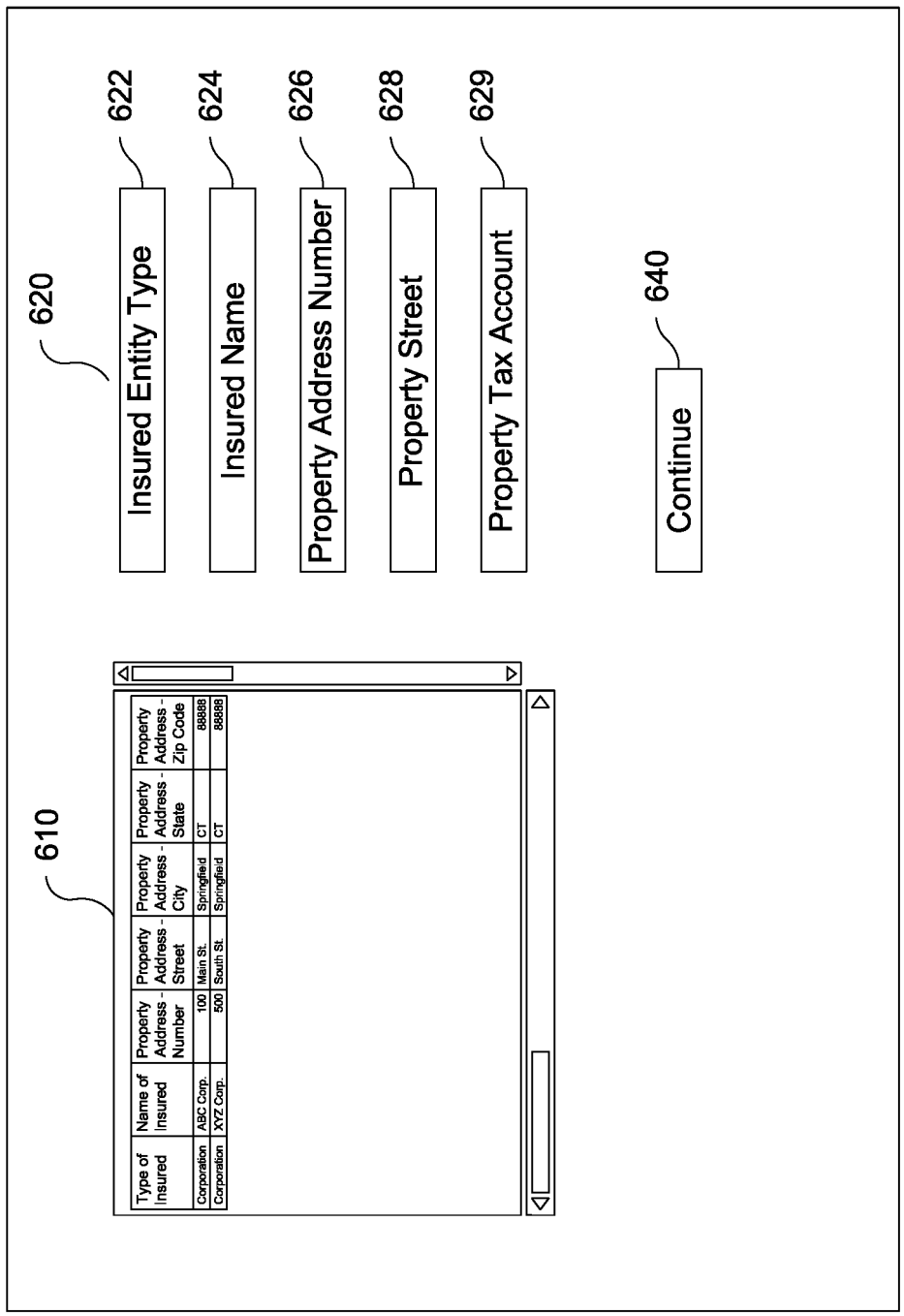
FIG. 6 is an exemplary screen display prompting a user to map data fields in a user-supplied documents to system data fields for an insurance transaction in an embodiment of the invention.
Figure 7:
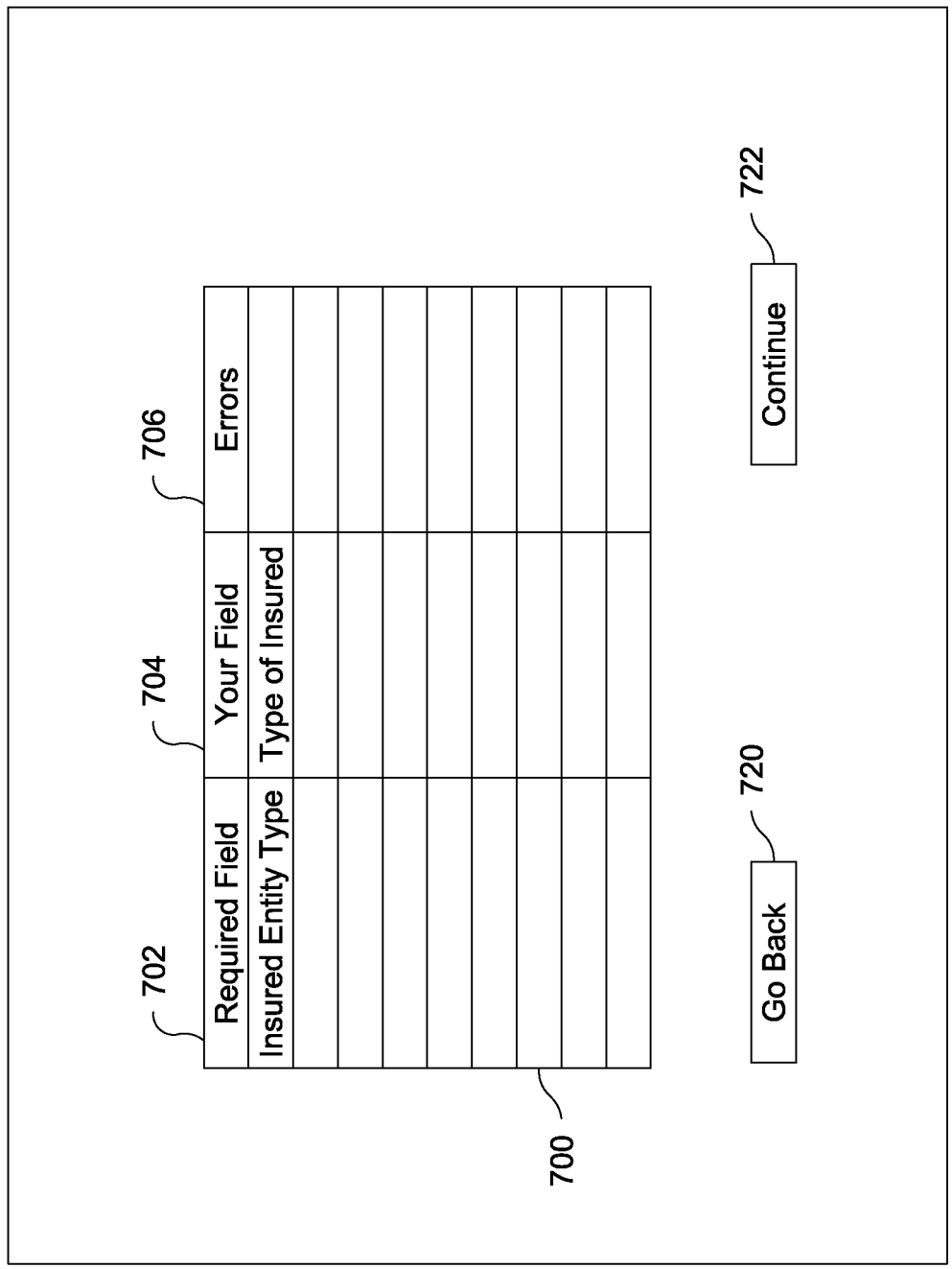
FIG. 7 is an exemplary screen display showing mapping between fields in a user-supplied document and system data fields for an insurance transaction in an embodiment of the invention.

Referring now to FIG. 6, an exemplary screen provided in response to user upload of a file for mapping is shown. The server system receives the file, determines a file type, such as from a file name extension, and launches either an application suitable for opening the file or a suitable viewer program. A view of an exemplary file is provided in window 610. The exemplary file is a spreadsheet, and may be an Excel format file, for example. In area 620, the system displays buttons associated with required fields associated with the selected insurance transaction type. A user may select a required field, by selecting button 622 for insured entity type, for example, and then position a cursor on a column in window 610, and select the column, such as by double clicking on a mouse, to select the column to correspond to the required field. In this example, required fields represented by button 624 for insured name, button 626 for property street number and button 628 for property street name correspond to columns shown in window 610. Button 629 for property tax account does not correspond to a column shown in window 610. After selecting the available required fields, the user may select Continue 640 to proceed. The system may then display, as shown in FIG. 7, a grid 700 showing in column 702 the required fields and in column 704 the names, extracted from the user s identified document, of the columns identified by the user employing the interface shown in FIG. 6. In column 706 a system generated error message may be displayed. The error message may be generated based on a matching rule run by the server. For example, a rule may provide that certain title mismatches are flagged, such as a title of zip code for a user document column in a required field for street name.

An error message may be generated if the system determines, such as by identifying an absence of data for a required field, that the provided data is incomplete, with respect to a complete set of data required for the selected insurance transaction. The error message may prompt the user to supply a particular field of data in an updated electronic file, for example. The system may execute business rules that require access to other databases for confirmation of furnished information. For example, an address may be compared to a geographical information systems database to determine if a street address corresponds to a street and a range of address numbers in a given zip code. For an automotive policy, data concerning a vehicle, such as vehicle identification number, tag number, make, model and year, may be compared to data in a vehicle identification number database. In response to performing a comparison and identifying one or more discrepancies, a message may be caused to be displayed on a user device highlighting data items that have discrepancies. The system may have a library of messages that are returned according to rules depending on the discrepancy. The messages may state, for example, Zip code and street address are not consistent. The message may contain an alternative, such as: Do you mean zip code 12345? For message may state, for example: VIN number incorrect. In an embodiment, an input field may be provided in a user interface that permits a user to enter data which is received by the system and then used to update the user file. Alternatively, the user may update the user file on the user s system, and then attempt to complete the mapping.

A user may use the Go Back feature of FIG. 7 to return to the display of FIG. 6 and correct mapping errors. The user may then use the Continue feature of FIG. 6, which causes the system to update the grid 700 and redisplay FIG. 7. If the document is missing required fields, in an embodiment, the user will not be able to continue beyond FIG. 7. The mapping data may be saved by the server system, and the user may, after creating a modified document including any previously absent required fields, upload the modified document and repeat the process. The mapping data may identify the file format from which the data is taken, and associate each required or optional field of the system with a column or other data element in the user-furnished document.

The display of FIG. 6 may include a document provided to the server system by other methods, such as by e-mail attachment. The document displayed in FIG. 6 may be generated from a structured fax received at a server.

In an embodiment, the system may, upon receiving the user electronic file, determine a format for the file, and then compare column headers or other suitable identifying information to a dictionary of identifiers that correspond to names of required fields. The system may then determine a predictive mapping, which is stored in a mapping data file, and is provided to the user, such as in the format of the grid of FIG. 9.

In FIG. 9, column 902 displays required fields. Column 904 displays fields from the user data that have been predictively mapped to the corresponding required fields of column 902. Buttons 910 serve as inputs that permit the user to provide verification to the system of the predictive mapping, and buttons 920 serve as inputs that permit the user to clear the mapping. In response to clearing a mapping, the system may display a menu of alternative user fields for user selection. The inputs are received by the system and stored in an updated mapping data file.

In an embodiment, user data may be provided in a text document format. The text document may be formatted, for example, with field identifiers followed by punctuation symbols then followed by data in a line of text.

In an embodiment, user data may be provided via an interactive voice recognition system. The IVR system may prompt the user to provide data corresponding to each required field, and then convert the received voice data to a suitable format.

If all of the fields have been mapped, the system may then proceed to store the mapping data in a database in association with data identifying the user. The system may also employ the mapping data to map the data from the user file to a predetermined format, such as ACORD XML, and pass the mapped data to another system, such as a quote generation system, for further processing. Prior to passing the mapped data, the system may apply rules to the mapped data. Such rules may include, for example, comparing mapped data in a field to permitted values. The rules may include verifying whether the received data is in an appropriate format; for example, if a U.S. zip code field is determined to contain characters other than numbers, the format is not appropriate, and the verifying step may result in a prompt to the user for corrected data. Such rules may include comparing mapped data to external sources of data, such as seeking to verify address data against geographical databases. If an error is found, the user may be prompted to supply corrected data, such as by uploading a corrected file in the user s format.

Figure 8:
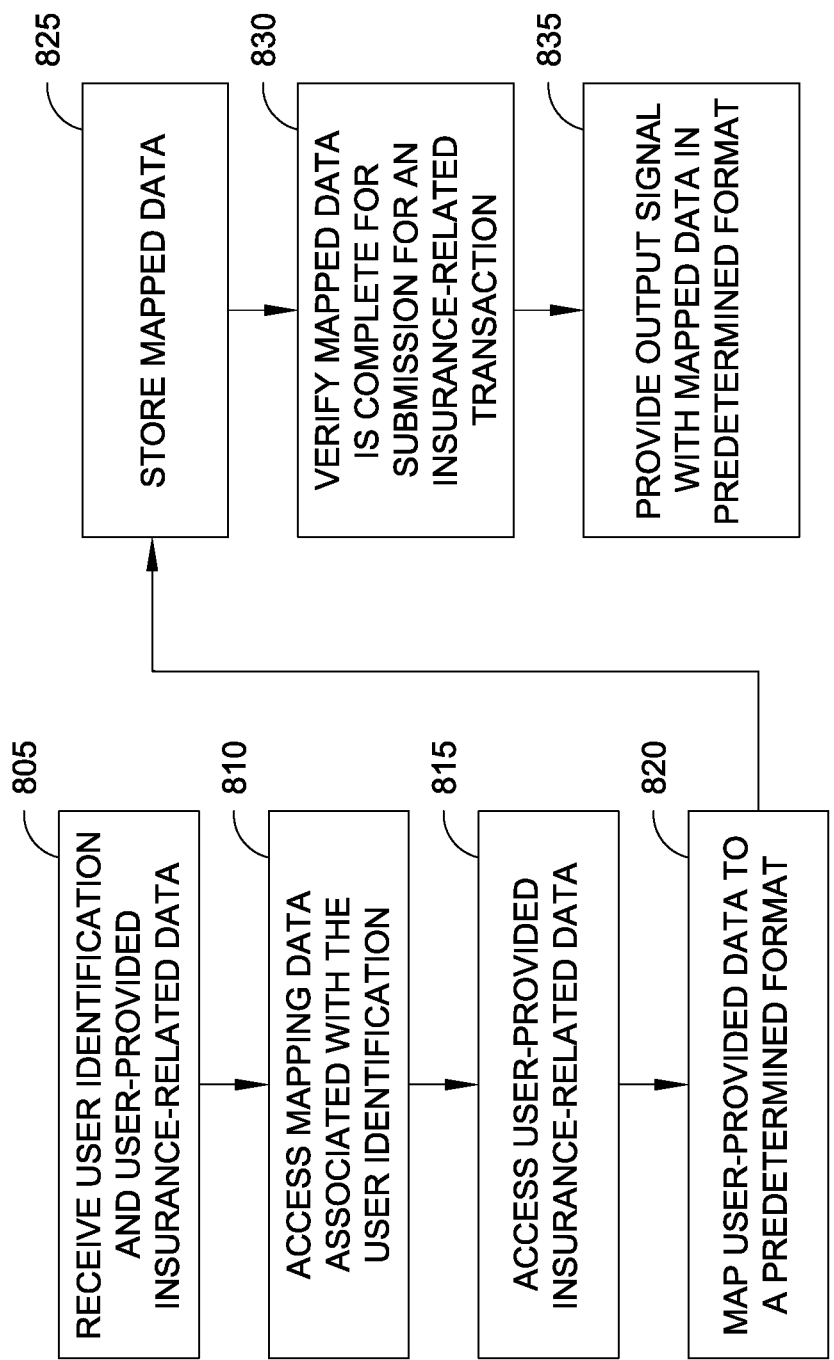
FIG. 8 is a process flow diagram of a process of mapping data for use in an insurance transaction in an embodiment of the invention.

A method relating to receipt, subsequent to creation of a mapping file, of a user identification and further user data in a further user file will be explained with reference to FIG. 8. Referring to FIG. 8, in an embodiment, a processor, such as a processor of server 150 of FIG. 1, receives 805 a user identification and user-provided insurance-related data. The user identification may be received via secure website logon, in an e-mail, as data in a fax that has been digitized by OCR or other processes, or otherwise. The user-provided insurance-related data may be contained in one or more electronic files that are uploaded, e-mailed or otherwise made accessible to the processor. The processor accesses 810 from a memory storage device mapping data associated with the user identification. In an embodiment, the user may be prompted to supply additional data, such as a further password. If there is more than one set of mapping data associated with the user, the user may be required to specify the set of mapping data, such as by identifying a type of insurance transaction. The mapping data identifies a format of the user electronic file and maps between a insurance-related data fields used by the system and data fields in the user-provided insurance-related data. The processor accesses 815 from a memory storage device a file having the user-provided insurance-related data. Employing the accessed mapping data, the processor maps 820 data elements identified in the user electronic file, to a document in a predetermined format, and stores 825 the document in the predetermined format in a memory storage device. The processor verifies 830 that the mapped data constitutes complete data to submit in connection with an insurance transaction. The processor provides 835 an output signal including data constituting the document in a predetermined format, to a system for further processing in accordance with an insurance transaction.

In an embodiment, the process flow of FIG. 8 may be performed by a processor of smart phone 176 of FIG. 1 accessing and executing instructions stored in a computer-readable memory of smart phone 176. The instructions may be embodied in an application program that may be executed by the processor of smart phone 176.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with the invention described herein may be so implemented.

An exemplary advantage of a system and method in accordance with an embodiment is that translating of insurance data from one format to another is performed without the need to re-enter the data or to provide mapping data each time a similar file is provided.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for translating insurance-related data, comprising:
   a processor;
   a memory storage device in communication with the processor;
   the processor adapted to:
   receive via a computer communications network a user identification and an identification of a user electronic file in a remote storage location, the user electronic file being in any one of a plurality of formats, and having data related to a request for an insurance quote;

provide an output signal for display to the user on a display device connected to the processor via the computer communications network a prompt for the user to provide mapping data mapping a plurality of data fields classifying data for requests for insurance quotes to data identifiers in the user electronic file;

receive mapping data in response to the prompt;

access the user electronic file;

employing the received mapping data, map data elements, the elements including at least a name of the proposed insured and an address of the proposed insured, identified in the user electronic file, to an ACORD XML compliant format document;

determine whether the mapped data elements constitute all required data for submission of a request for an insurance quote; and if the mapped data elements do not constitute all required data, prompt the user for further data; otherwise provide an output signal communicating the ACORD XML compliant format document to a quote evaluation system.

2. The system of claim 1, wherein the plurality of formats comprise text document formats, spreadsheet formats, database formats and XML formats.

3. The system of claim 1, wherein the processor is further adapted to, prior to prompting the user for mapping data, access the user electronic file, and determine a predictive mapping of data, and wherein the prompt for the user to provide mapping data comprises prompts for verification of the predictive mapping.

4. The system of claim 3, wherein the determining a predictive mapping of data comprises determining a format of the user electronic file and comparing data in the user electronic file to a dictionary of identifiers.

5. The system of claim 3, wherein the processor is further adapted to prompt the user to enter data indicative of a particular type of insurance transaction for which the request for insurance quote is being made, the processor determining all required data fields based on the insurance transaction type entered by the user; and wherein the processor uses the required data fields to determine and display said predictive mapping of data to the user.

6. The system of claim 1, wherein the processor is further adapted to store in the memory storage device the mapping data and an association between the mapping data and the user identification, and responsive to a subsequent receipt of user identification and a further user file identification, access the further user file and map the data in the further user file to ACORD XML format.

7. The system of claim 1, wherein the processor is further adapted to apply rules to the mapped data, and to prompt a user for corrected data if a rule is violated.

8. A computer system for translating insurance-related data, comprising:

a processor; and a memory storage device in communication with the processor;

the processor adapted to:

receive via a computer communications network a user identification and an identification of an electronic file having user-generated insurance-related data;

provide an output signal for display to the user a prompt for the user to provide mapping data mapping a plurality of insurance-related data fields to data identifiers in the user-data electronic file;

receive mapping data in response to the prompt;

access the user electronic file;

employing the received mapping data, map data elements identified in the user-data electronic file, to a document in a predetermined format;

verify that the received mapped data constitutes complete data to submit in connection with an insurance transaction; and provide an output signal including data constituting the document in a predetermined format to a system for further processing in accordance with an insurance transaction.

9. The computer system of claim 8, wherein the receiving of the identification of the electronic file comprises receiving via e-mail.

10. The computer system of claim 9, wherein the receiving of the identification of the electronic file comprises receiving the electronic file via e-mail as an attachment to an e-mail.

11. The computer system of claim 8, wherein the receiving of the identification of the electronic file comprises receiving via http post.

12. The computer system of claim 8, wherein the predetermined format is ACORD XML.

13. The computer system of claim 8, further comprising a firewall unit, wherein the processor receives the user identification and the identification of the user electronic file via the firewall unit.

14. The computer system of claim 8, wherein the verifying comprises determining whether the received data includes data in an appropriate format for each of the data fields.

15. A computer system for translating insurance-related data, comprising:

a processor; and a memory storage device in communication with the processor;

the processor adapted to:

receive via a computer communications network a user identification and an identification of a user electronic file having insurance-related data;

access from the memory storage device mapping data associated with the user identification, the mapping data identifying a format of the user electronic file and mapping between a plurality of insurance-related data fields and data identifiers in the user electronic file;

access the user electronic file;

employing the accessed mapping data, map data elements identified in the user electronic file, to a document in a predetermined format;

verify that the mapped data constitutes complete data to submit in connection with an insurance transaction; and provide an output signal including data constituting the document in a predetermined format to a system for further processing in accordance with an insurance transaction.

16. The computer system of claim 15, wherein the processor is further adapted to, in response to determining that the mapped data does not constitute complete data to submit in connection with an insurance transaction, provide an output signal having data indicative of an identification of an incomplete nature of the mapped data.

17. The computer system of claim 15, wherein the transaction is a request for a quote.

18. A computer-implemented method for translating insurance-related data, comprising:
- receiving by a processor via a computer communications network a user identification and insurance related data;
- providing by the processor an output signal for display to the user a prompt for the user to provide mapping data mapping a plurality of insurance-related data fields to data identifiers in a user electronic file containing the insurance related data;
- receiving by the processor mapping data in response to the prompt;
- accessing by the processor the insurance-related data in the user electronic file;
- employing the received mapping data, mapping by the processor the user insurance-related data, and storing the mapped data in a data storage device in a document in a predetermined format;
- verifying by the processor that the received mapped data constitutes complete data to submit in connection with an insurance transaction; and
- providing by the processor an output signal including data constituting the document in a predetermined format to a system for further processing in accordance with an insurance transaction.

19. The computer-implemented method of claim 18, wherein the receiving the user identification comprises receiving the user identification via a firewall unit.

20. The computer-implemented method of claim 18, wherein the user data is received via fax.

21. The computer-implemented method of claim 18, wherein the user data is received via interactive voice recognition.

22. The computer-implemented method of claim 18, wherein the user data is received via electronic mail.

23. The computer-implemented method of claim 18, wherein the user data is received via web form.

24. The computer-implemented method of claim 18, wherein the user data is received via http post.

25. The computer-implemented method of claim 18, wherein the insurance transaction is a request for a quote.

26. The computer-implemented method of claim 18, further comprising:
- prompting the user to enter data indicative of a particular type of insurance transaction for which a request for insurance quote is being made, the processor determining all required data fields based on the insurance transaction type entered by the user; and
- wherein the step of providing a prompt for the user to provide mapping data mapping the insurance-related data fields to the data identifiers in the user electronic file further comprises: displaying at least some of said required data fields on a display, along with the data identifiers in the user electronic file, to enable user association of said data fields and said data identifiers.

27. A computer-implemented method for translating insurance-related data, comprising:
- receiving by a processor a user identification and user-provided insurance-related data;
- accessing by the processor from a memory storage device mapping data associated with the user identification, the mapping data identifying a format of the user electronic file and mapping between a plurality of insurance-related data fields and data fields in the user-provided insurance-related data;
- accessing by the processor from the memory storage device a file having the user-provided insurance-related data;
- employing the accessed mapping data, mapping by the processor data elements identified in the user electronic file, to a document in a predetermined format, and storing the document in the predetermined format in the memory storage device;
- verifying by the processor that the mapped data constitutes complete data to submit in connection with an insurance transaction; and
- providing by the processor an output signal including data constituting the document in a predetermined format to a system for further processing in accordance with an insurance transaction.

28. The computer-implemented method of claim 27, wherein the receiving the user identification comprises receiving the user identification via a firewall unit.

29. The computer-implemented method of claim 27, wherein the user data is received via fax.

30. The computer-implemented method of claim 27, wherein the user data is received via interactive voice recognition.

31. The computer-implemented method of claim 27, wherein the user data is received via electronic mail.

32. The computer-implemented method of claim 27, wherein the user data is received via web form.

33. The computer-implemented method of claim 27, wherein the insurance transaction is a request for a quote.

34. A non-transitory computer-readable medium having a plurality of instructions thereon for translating insurance-related data, which instructions, when executed by a processor, cause the processor to:
- receive via a computer communications network a user identification and an identification of a user electronic file, the user electronic file being in any one of a plurality of structured formats, and having insurance-related data;
- provide an output signal for display to the user a prompt for the user to provide mapping data mapping a plurality of insurance-related data fields to data identifiers in the user electronic file;
- receive mapping data in response to the prompt;
- access the user electronic file;
- employing the received mapping data, map data elements identified in the user electronic file, to a document in a predetermined format;
- verify that the received mapped data constitutes complete data to submit in connection with an insurance transaction; and
- provide an output signal including data constituting the document in a predetermined format to a system for further processing in accordance with an insurance transaction.

35. The computer-readable medium of claim 34, wherein the instructions further cause the processor to access a user-generated electronic file.

36. The computer-readable medium of claim 34, wherein the instructions further cause the processor to generate an output signal having data for prompting a user to provide further mapping data.

* * * * *